United States Patent
Katoh et al.

Patent Number: 5,404,973
Date of Patent: Apr. 11, 1995

[54] DAMPING FORCE CONTROL TYPE HYDRAULIC SHOCK ABSORBER

[75] Inventors: Tetsuo Katoh; Takao Nakadate, both of Kanagawa, Japan

[73] Assignee: Tokico Ltd., Kanagawa, Japan

[21] Appl. No.: 206,627

[22] Filed: Mar. 7, 1994

[30] Foreign Application Priority Data

Mar. 8, 1993 [JP] Japan .................. 5-073051
Nov. 19, 1993 [JP] Japan .................. 5-314230

[51] Int. Cl.6 .............................. F16F 9/34
[52] U.S. Cl. ................. 188/319; 188/299; 188/322.15
[58] Field of Search ........ 188/282, 299, 319, 322.13, 188/322.15, 322.22; 280/707

[56] References Cited

U.S. PATENT DOCUMENTS

| | | | |
|---|---|---|---|
| 5,088,760 | 2/1992 | Kakizaki et al. | 280/707 |
| 5,129,488 | 7/1992 | Furuya et al. | 188/282 |
| 5,193,655 | 3/1993 | Sasaki et al. | 188/299 |
| 5,242,038 | 9/1993 | Yamaoka | 188/319 |
| 5,293,971 | 3/1994 | Kanari et al. | 188/299 |
| 5,316,114 | 5/1994 | Furuya et al. | 188/319 |
| 5,324,066 | 6/1994 | Masamura et al. | 188/299 |

FOREIGN PATENT DOCUMENTS

58-70533 5/1983 Japan .
5-272570 10/1993 Japan .

*Primary Examiner*—Robert J. Oberleitner
*Assistant Examiner*—Chris Schwartz
*Attorney, Agent, or Firm*—Wenderoth, Lind & Ponack

[57] ABSTRACT

In a damping force control type hydraulic shock absorber according to the invention, an extension-side bypass passage extends through an extension-side chamber (17b) in a shutter (17). A check valve (28) allows the flow of hydraulic fluid only during the extension stroke. A contraction-side bypass passage extends through a contraction-side chamber (17a) in the same shutter (17). Disk valves (30) allow the flow of hydraulic fluid only during the contraction stroke. By rotating the shutter (17), alignment between an extension-side inlet port (31) and an extension-side inlet opening (34) changes and alignment between a contraction-side inlet port (32) and a contraction-side inlet opening (33) also changes, thereby controlling the passage area of each of the extension- and contraction-side bypass passages, and thus enabling different damping force characteristics to be simultaneously selected for the extension and contraction sides. Since the extension- and contraction-side chambers (17a, 17b) are independent of each other, no turbulent flow will occur in the shutter (17) when the direction of stroke of a piston rod (8) changes, and hence no noise will be generated.

8 Claims, 7 Drawing Sheets

CONTRACTION STROKE   EXTENSION STROKE

DAMPING FORCE CONTROL TYPE HYDRAULIC SHOCK ABSORBER

BACKGROUND OF THE INVENTION

1. Field of the Invention

The present invention relates to a damping force control type hydraulic shock absorber attached to a suspension system of a vehicle, for example, an automobile.

2. Description of the Background Art

Hydraulic shock absorbers attached to suspension systems of automobiles or other vehicles include damping force control type hydraulic shock absorbers which are designed so that the level of damping force can be properly controlled in accordance with the road surface conditions, vehicle running conditions, etc., with a view to improving the ride quality and the steering stability.

This type of hydraulic shock absorber has heretofore been arranged as disclosed, for example, in Japanese Utility Model Application Public Disclosure (KOKAI) No. 58-70533. That is, the conventional hydraulic shock absorber includes a cylinder having a hydraulic fluid sealed therein, and a piston which has a piston rod connected thereto is slidably fitted in the cylinder to define therein two cylinder chambers. The two cylinder chambers are communicated with each other by a main hydraulic fluid passage and a bypass passage. The main hydraulic fluid passage is provided with a damping force generating mechanism (including orifices, disk valves, etc.) for generating a relatively large damping force. The bypass passage is provided with a damping force generating a mechanism for generating relatively small damping force and a damping force control valve for opening and closing the bypass passage.

With the above-described arrangement, when the damping force control valve is opened, the hydraulic fluid in the cylinder is induced to flow mainly through the bypass passage by the sliding movement of the piston caused by the extension and contraction of the piston rod, thereby generating a relatively small damping force. Accordingly, the damping force characteristics are "soft" during both the extension and contraction strokes. When the damping force control valve is closed, the hydraulic fluid in the cylinder is induced to flow through only the main hydraulic fluid passage by the sliding movement of the piston caused by the extension and contraction of the piston rod, thereby generating a relatively large damping force. Accordingly, the damping force characteristics are "hard" during both the extension and contraction strokes. Thus, the damping force characteristics can be changed by opening and closing the damping force control valve.

During the normal running of the vehicle, "soft" damping force characteristics are selected to absorb vibration caused by unevenness of the road surface, thereby improving the ride quality. When the vehicle is turned, accelerated, braked or run at high speed, "hard" damping force characteristics are selected to suppress the change in attitude of the vehicle body, thereby improving the steering stability.

Further, there is a suspension control system in which damping force characteristics are automatically changed in accordance with the road surface conditions, vehicle running conditions, etc., by combining a controller and an actuator with a damping force control type hydraulic shock absorber, thereby improving the ride quality and the steering stability.

In the above-described suspension control system, the appropriate damping force can be quickly obtained for a change in the road surface conditions or vehicle running conditions by making it possible to set a combination of different damping force characteristics for the extension and contraction sides, and the ride quality and the steering stability can be effectively improved.

Accordingly, the present applicant has proposed a damping force control type hydraulic shock absorber in Japanese Patent Application Public Disclosure (KOKAI) No. Hei 5-272570. The proposed hydraulic shock absorber is of the type in which two chambers defined by a piston are communicated with each other by a main hydraulic fluid passage and a bypass passage so that the damping force can be controlled by controlling the passage area of the bypass passage. The proposed hydraulic shock absorber includes a pair of first and second check valves provided in the bypass passage to allow the flow of hydraulic fluid in respective directions which are opposite to each other, a first hydraulic fluid passage that bypasses the first check valve, a second hydraulic fluid passage that bypasses the second check valve, and first and second damping force control valves for controlling the areas of the first and second hydraulic fluid passages, respectively.

According to the above damping force control type hydraulic shock absorber, either the first or second check valve is bypassed by opening one of the first and second damping force control valves and closing the other. Since the bypass passage allows the flow of hydraulic fluid in only one direction, "soft" characteristics are obtained for a piston rod stroke during which the bypass passage allows the flow of hydraulic fluid, while "hard" characteristics are obtained for the other stroke. Thus, it is possible to set a combination of different damping force characteristics for the extension and contraction sides.

The damping force control type hydraulic shock absorber disclosed in Japanese Patent Application Public Disclosure (KOKAI) No. 05-272570 suffers, however, from the following problem. Since one bypass passage is used for both the extension and contraction strokes and the first and second damping force control valves use hydraulic fluid passages in common, it is likely that when the direction of the stroke changes, turbulence will occur in the flow of hydraulic fluid in the damping force control valves, causing noise to be generated.

SUMMARY OF THE INVENTION

In view of the above-described circumstances, it is an object of the present invention to provide a damping force control type hydraulic shock absorber which is designed so that it is possible to set a combination of different damping force characteristics for the extension and contraction sides, and yet turbulence is unlikely to occur in the flow of hydraulic fluid in the bypass passage when the direction of stroke changes.

To attain the above-described object, the present invention provides a damping force control type hydraulic shock absorber including a cylinder having a hydraulic fluid sealed therein. A piston is slidably fitted in the cylinder to define therein two cylinder chambers. A piston rod is connected at one end thereof to the piston. The other end portion of the piston rod extends as far as the outside of the cylinder. A main hydraulic fluid passage provides communication between the two cylinder chambers, and has a damping force generating mechanism. An extension-side bypass passage provides communication between the two cylinder chambers, and has a check valve that allows the flow of hydraulic fluid during the extension stroke. A contraction-side bypass passage provides communication between the two cylinder chambers, and has a check valve that allows the flow of hydraulic fluid during the contraction stroke. The damping force control type hydraulic shock absorber further includes a damping force control mechanism which is composed of a cylindrical guide and a cylindrical shutter. The guide has a pair of extension-side inlet and outlet ports formed in the side wall thereof to provide communication for the extension-side bypass passage. The guide further has a pair of contraction-side inlet and outlet ports formed in the side wall to provide communication for the contraction-side bypass passage. The shutter is rotatably fitted in the guide and has two independent chambers, that is, an extension-side chamber and a contraction-side chamber. The shutter is provided in the side wall thereof with a pair of extension-side inlet and outlet openings communicated with the extension-side chamber and a pair of contraction-side inlet and outlet openings communicated with the contraction-side chamber. By rotating the shutter, the extension-side inlet and outlet ports and the extension-side inlet and outlet openings are respectively aligned with each other, and the contraction-side inlet and outlet ports and the contraction-side inlet and outlet openings are respectively aligned with each other, thereby allowing the extension-side bypass passage to communicate through the extension-side chamber and also allowing the contraction-side bypass passage to communicate through the contraction-side chamber, and thus controlling the passage area of each of the extension- and contraction-side bypass passages.

According to one aspect of the present invention, the damping force control type hydraulic shock absorber further includes a pair of chambers formed outside both ends, respectively, of the shutter by closing both ends of the cylindrical guide, and a pressurizing passage for providing communication between the chamber outside one end of the shutter which is pressurized by the hydraulic fluid leaking through a gap between the guide and the shutter in response to the movement of the piston toward one side and one of the cylinder chambers which is pressurized by the movement of the piston toward the other side. In addition, a check valve is provided in the pressurizing passage to allow the flow of hydraulic fluid only from the above-described cylinder chamber toward the above-described chamber outside the end of the shutter.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Embodiments of the present invention will be described below in detail with reference to the accompanying drawings.

Figure 1:
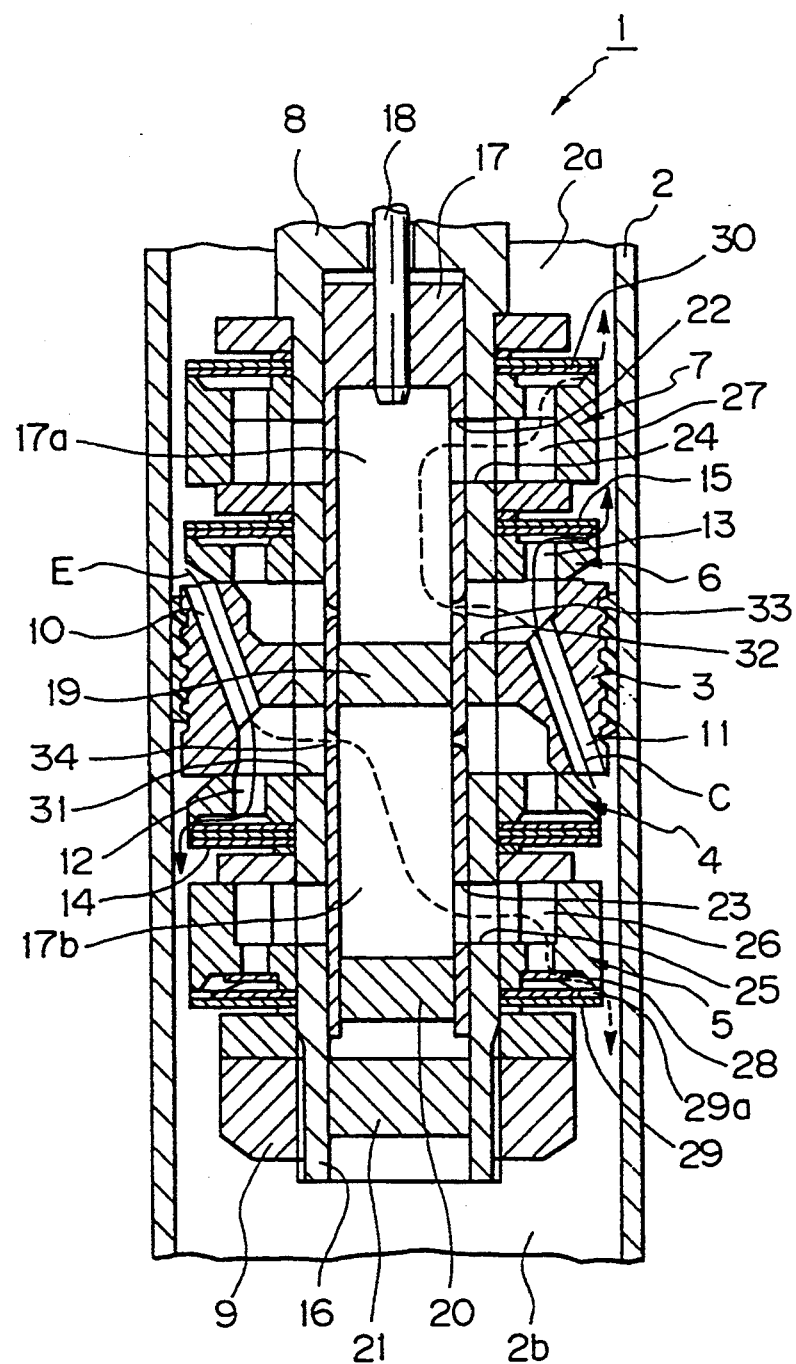
FIG. 1 is a fragmentary longitudinal sectional view showing an essential part of a first embodiment of a damping force control type hydraulic shock absorber according to the present invention.

A first embodiment will be described with reference to FIG. 1. As shown in the figure, a damping force control type hydraulic shock absorber 1 includes a cylinder 2 having a hydraulic fluid sealed therein. A piston 3 is slidably fitted in the cylinder 2. The piston 3 divides the inside of the cylinder 2 into two chambers, that is, a cylinder upper chamber 2a and a cylinder lower chamber 2b. The end face of the piston 3 which faces the cylinder lower chamber 2b is provided with an extension-side main valve seat member 4, and an extension-side valve seat member 5 is provided on the main valve seat member 4. The end face of the piston 3 which faces the cylinder upper chamber 2a is provided with a contraction-side main valve seat member 6, and a contraction-side valve seat member 7 is provided on the main valve seat member 6. The piston 3, the extension-side main valve seat member 4, the extension-side valve seat member 5, the contraction-side main valve seat member 6 and the contraction-side valve seat member 7 are pierced with one end portion of a piston rod 8 and secured to the piston rod 8 as one unit by a nut 9. The other end portion of the piston rod 8 extends as far as the outside of the cylinder 2 through a rod guide (not shown) and a seal member (not shown), which are provided in the upper end portion of the cylinder 2. A reservoir chamber (not shown) is connected to the cylinder 2 to compensate for changes in the volumetric capacity in the cylinder 2, which correspond to the amount by which changes the piston rod 8 enters or withdraws from the cylinder 2, by compression or expansion of a gas sealed in the reservoir chamber.

The piston 3 is provided with an extension-side hydraulic fluid passage 10 and a contraction-side hydraulic fluid passage 11 for providing communication between the cylinder upper and lower chambers 2a and 2b. The extension-side hydraulic fluid passage 10 is communicated with the cylinder lower chamber 2b through a passage 12 in the extension-side main valve seat member 4, and the contraction-side hydraulic fluid passage 11 is communicated with the cylinder upper chamber 2a through a passage 13 in the contraction-side main valve seat member 6. The extension-side main valve seat member 4 is provided with a damping force generating mechanism including disk valves 14, which generate damping force by controlling the flow of hydraulic fluid in the passage 12 during the extension stroke. The contraction-side main valve seat member 6 is provided with a damping force generating mechanism including disk valves 15, which generate damping force by controlling the flow of hydraulic fluid in the passage 13 during the contraction stroke. That is, the extension-side hydraulic fluid passage 10, the contraction-side hydraulic fluid passage 11, the passage 12 and the passage 13 constitute main hydraulic fluid passages for providing communication between the cylinder upper and lower chambers 2a and 2b.

One end portion of the piston rod 8 is provided with a hole extending axially from the end thereof to form a cylindrical guide portion 16. A cylindrical shutter 17, one end of which is closed, is rotatably fitted in the guide portion 16. The guide portion 16 and the shutter 17 constitute a damping force control mechanism. A control rod 18 is connected to the bottom of the shutter 17. The control rod 18 extends as far as the outside of the cylinder 2 along the piston rod 8 so that the shutter 17 can be rotated from the outside of the damping force control type hydraulic shock absorber 1. Partition members 19 and 20 are fitted in the shutter 17 to define therein two independent chambers, that is, a contraction-side chamber 17a and an extension-side chamber 17b. A plug 21 is fitted in the opening of the guide portion 16.

The side wall of the shutter 17 is provided with a passage 22 as a contraction-side outlet opening that is communicated with the contraction-side chamber 17a, and a passage 23 as an extension-side outlet opening that is communicated with the extension-side chamber 17b. The guide portion 16 of the piston rod 8 is provided with a passage 24 as a contraction-side outlet port that is constantly communicated with the passage 22, and a passage 25 as an extension-side outlet port that is constantly communicated with the passage 23. The passage 25 in the guide portion 16 is communicated with the cylinder lower chamber 2b through a passage 26 in the extension-side valve seat member 5. The passage 24 in the guide portion 16 is communicated with the cylinder upper chamber 2a through a passage 27 in the contraction-side valve seat member 7. The extension-side valve seat member 5 is provided with a check valve 28 that allows the flow of hydraulic fluid through the passage 26 only during the extension stroke, and a damping force generating mechanism including disk valves 29 and orifices 29a provided in one of the disk valves 29, which are adapted to generate damping force by controlling the flow of hydraulic fluid in the passage 26 during the extension stroke. The contraction-side valve seat member 7 is provided with a damping force generating mechanism including disk valves 30, which function as a check valve to allow the flow of hydraulic fluid through the passage 27 only during the contraction stroke, thereby generating damping force. The orifices 29a and the disk valves 29, which are provided on the extension-side valve seat member 5, are set so as to generate a damping force smaller than that generated by the disk valves 14 provided on the extension-side main valve seat member 4. The disk valves 30 on the contraction-side valve seat member 7 are set so as to generate a damping force smaller than that generated by the disk valves 15 on the contraction-side main valve seat member 6.

The guide portion 16 of the piston rod 8 is provided with an extension-side inlet port 31 communicated with the extension-side hydraulic fluid passage 10 in the piston 3, and a contraction-side inlet port 32 communicated with the contraction-side hydraulic fluid passage 11 in the piston 3. The shutter 17 is provided with a contraction-side inlet opening 33 communicated with the contraction-side chamber 17a. The contraction-side inlet opening 33 is provided at a position which faces the contraction-side inlet port 32. The shutter 17 is also provided with an extension-side inlet opening 34 communicated with the extension-side chamber 17b. The extension-side inlet opening 34 is provided at a position which faces the extension-side inlet port 31. The extension-side hydraulic fluid passage 10, the extension-side inlet port 31, the extension-side inlet opening 34, the extension-side chamber 17b, the passage 23, the passage 25 and the passage 26 form an extension-side bypass passage for providing communication between the cylinder upper and lower chambers 2a and 2b. On the other hand, the contraction-side hydraulic fluid passage 11, the contraction-side inlet port 32, the contraction-side inlet opening 33, the contraction-side chamber 17a, the passage 22, the passage 24 and the passage 27 form a contraction-side bypass passage for providing communication between the cylinder upper and lower chambers 2a and 2b.

The contraction-side inlet opening 33 and the extension-side inlet opening 34 each extend circumferentially of the shutter 17. The contraction-side inlet opening 33 has a generally wedge-like shape in which the width of the opening 33 gradually increases in one circumferential direction. The extension-side inlet opening 34 has a generally wedge-like shape in which the width of the opening 34 gradually increases in the opposite circumferential direction. With this arrangement, as the shutter 17 is rotated, the passage area determined by the degree of alignment of the contraction-side inlet port 32 and the contraction-side inlet opening 33 changes, and thus the passage area of the contraction-side bypass passage is controlled. At the same time, the passage area determined by the degree of alignment of the extension-side inlet port 31 and the extension-side inlet opening 34 changes, and the passage area of the extension-side bypass passage is controlled.

Figure 3:
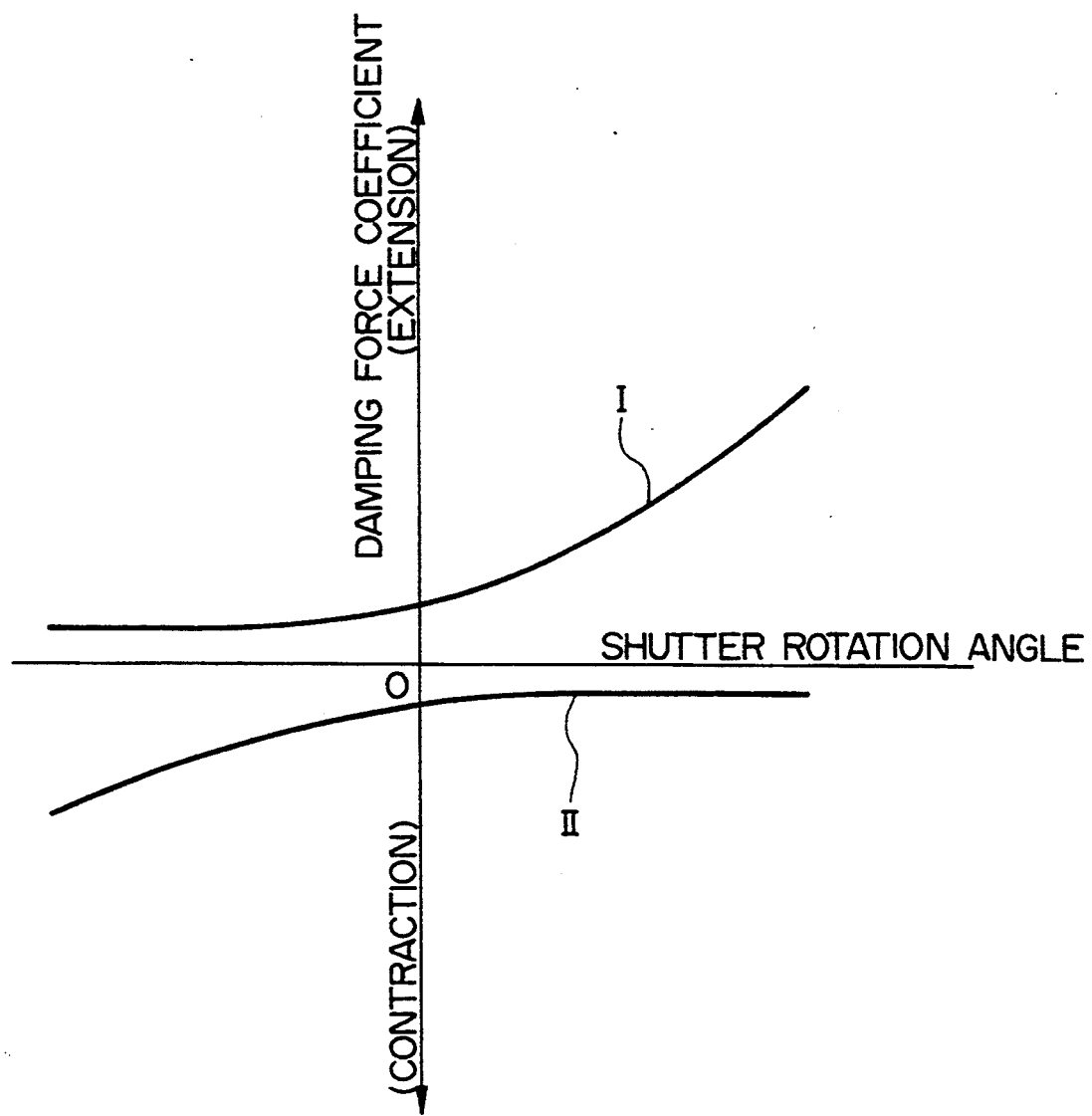
FIG. 3 is a graph showing damping force coefficients relative to the angle of rotation of a shutter of a damping force control mechanism in the damping force control type hydraulic shock absorber shown in FIG. 1.

The arrangement is such that when the communicating passage that is formed by the alignment of the extension-side inlet port 31 and the extension-side inlet opening 34 is fully open, the communicating passage formed by the alignment of the contraction-side inlet port 32 and the contraction-side inlet opening 33 is fully closed. As the shutter 17 is rotated in one direction in this state, the sectional area of the communicating passage formed by the extension-side inlet port 31 and the extension-side inlet opening 34 decreases, while the sectional area of the communicating passage formed by the contraction-side inlet port 32 and the contraction-side inlet opening 33 increases. When the communicating passage formed by the alignment of the extension-side inlet port 31 and the extension-side inlet opening 34 is fully closed, the communicating passage formed by the alignment of the contraction-side inlet port 32 and the contraction-side inlet opening 33 is fully open. FIG. 3 shows the relationship between the angle of rotation of the shutter 17 on the one hand and the passage area formed by the extension-side inlet port 31 and the extension-side inlet opening 34 (the passage area being expressed by the damping force coefficient I on the extension side) and the passage area formed by the contraction-side inlet port 32 and the contraction-side inlet opening 33 (the passage area being expressed by the damping force coefficient II on the contraction side).

The operation of the first embodiment, arranged as described above, will be explained below.

Damping force characteristics can be changed by rotating the shutter 17 with the control rod 18, which is externally operated.

When the shutter 17 is rotated so that the communicating passage formed by the extension-side inlet port 31 and the extension-side inlet opening 34 is fully opened, while the communicating passage formed by the contraction-side inlet port 32 and the contraction-side inlet opening 33 is fully closed, the extension-side bypass passage is fully opened, while the contraction-side bypass passage is fully closed. Accordingly, during the extension stroke of the piston rod 8, the check valve 28 on the extension-side valve seat member 5 opens, and the hydraulic fluid in the cylinder upper chamber 2a can flow toward the cylinder lower chamber 2b through the extension-side bypass passage, as shown by the broken-line arrow E in FIG. 1. Thus, relatively small damping force is generated because of the passage area formed by the extension-side inlet port 31 and the extension-side inlet opening 34 and by the action of the orifices 29a and the disk valves 29 on the extension-side valve seat member 5. On the other hand, during the contraction stroke, the check valve 28 on the extension-side valve seat member 5 is closed, and hence the extension-side bypass passage is closed. Therefore, the hydraulic fluid in the cylinder lower chamber 2b flows toward the cylinder upper chamber 2a through the contraction-side hydraulic fluid passage 11 and the passage 13 in the contraction-side main valve seat member 6, as shown by the solid-line arrow C in FIG. 1. Accordingly, a relatively large damping force is generated by the action of the disk valves 15 on the contraction-side main valve seat member 6. Thus, the damping force characteristics are "soft" during the extension stroke and "hard" during the contraction stroke.

Figure 1A:
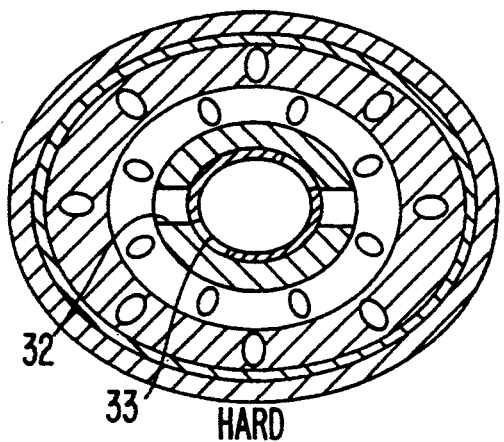
FIGS. 1A–1F are top-sectional views of the damping force control type hydraulic shock absorber of the first embodiment, with FIGS. 1A and 1B being cross sections taken at two different locations along the shock absorber in a first position of use, FIGS. 1C and 1D being cross sections taken at the same locations in a second position of use and FIGS. 1E and 1F being cross sections taken at the same points in a third position of use.
Figure 1B:
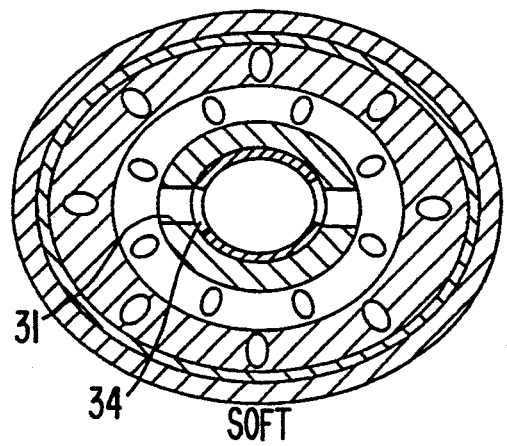

The above is further demonstrated in FIGS. 1A and 1B, wherein the extension-side inlet opening 34 is illustrated as aligned with the extension side inlet port 31 in FIG. 1B and the contraction-side inlet opening 33 is shown as fully closed with respect to the contraction-side inlet port 32 in FIG. 1A, thus providing the respective soft and hard damping force characteristics.

When the shutter 17 is rotated in one direction from the above-described position so that the area of the communicating passage formed by the extension-side inlet port 31 and the extension-side inlet opening 34 is reduced, while the communicating passage formed by the contraction-side inlet port 32 and the contraction-side inlet opening 33 is opened, the passage area of the extension-side bypass passage decreases, while the contraction-side bypass passage opens. Accordingly, during the extension stroke, the hydraulic fluid in the cylinder upper chamber 2a can flow toward the cylinder lower chamber 2b through the extension-side bypass passage, as shown by the broken-line arrow E in FIG. 1. Therefore, the damping force increases by an amount corresponding to the reduction in the passage area. At this time, the contraction-side bypass passage is closed by the disk valves 30 provided on the contraction-side valve seat member 7. On the other hand, during the contraction stroke, the hydraulic fluid in the cylinder lower chamber 2b can flow toward the cylinder upper chamber 2a through the contraction-side bypass passage, as shown by the broken-line arrow C in FIG. 1. Accordingly, a damping force smaller than that of the "hard" characteristics is generated in accordance with the area of the communicating passage formed by the contraction-side inlet port 32 and the contraction-side inlet opening 33 and by the action of the disk valves 30 on the contraction-side valve seat member 7. Thus, the damping force characteristics are "medium" during both the extension and contraction strokes, and a damping force smaller than that of the "hard" characteristics is generated.

Figure 1C:
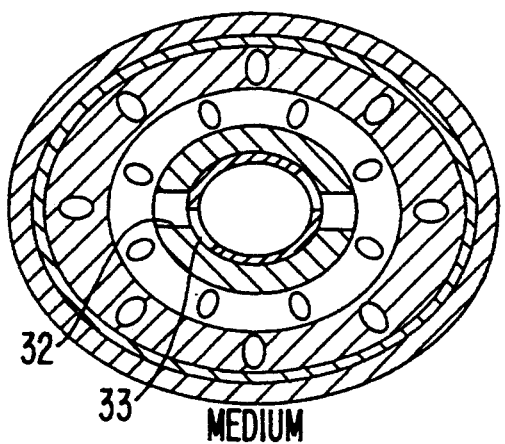
Figure 1D:
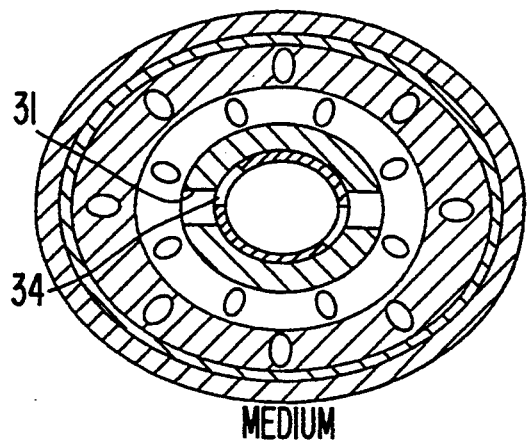

The relative positions of the contraction-side inlet opening 33 and the extension-side inlet opening 34 to the contraction-side inlet port 32 and the extension-side inlet port 31, respectively, are illustrated in FIGS. 1C and 1D, providing the "medium" damping force characteristics.

When the shutter 17 is further rotated in the same direction from the above-described position so that the communicating passage formed by the extension-side inlet port 31 and the extension-side inlet opening 34 is fully closed, while the communicating passage formed by the contraction-side inlet port 32 and the contraction-side inlet opening 33 is fully opened, the extension-side bypass passage is fully closed, while the contraction-side bypass passage is fully open. Accordingly, during the extension stroke of the piston rod 8, the disk valves 30 on the contraction-side valve seat member 7 are closed, and hence the contraction-side bypass passage is closed. Therefore, the hydraulic fluid in the cylinder upper chamber 2a flows toward the cylinder lower chamber 2b through the extension-side hydraulic fluid passage 10 in the piston 3 and the passage 12 in the extension-side main valve seat member 4, as shown by the solid-line arrow E in FIG. 1. Accordingly, a relatively large damping force is generated by the action of the disk valves 14 on the extension-side main valve seat member 4. On the other hand, during the contraction stroke, the hydraulic fluid in the cylinder lower chamber 2b can flow toward the cylinder upper chamber 2a through the contraction-side bypass passage, as shown by the broken-line arrow C in FIG. 1. Therefore, a relatively small damping force is generated because of the passage area formed by the contraction-side inlet port 32 and the contraction-side inlet opening 33 and by the action of the disk valves 30 on the contraction-side valve seat member 7. Accordingly, the damping force characteristics are "hard" during the extension stroke and "soft" during the contraction stroke.

Figure 1E:
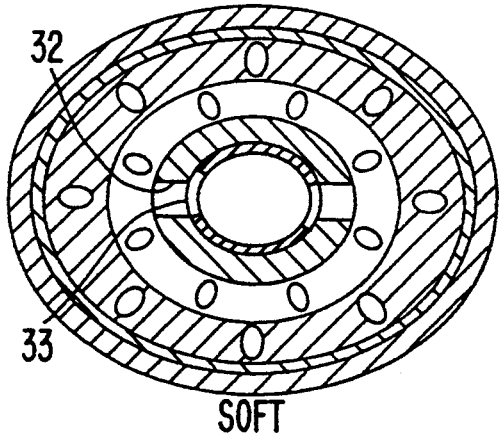
Figure 1F:
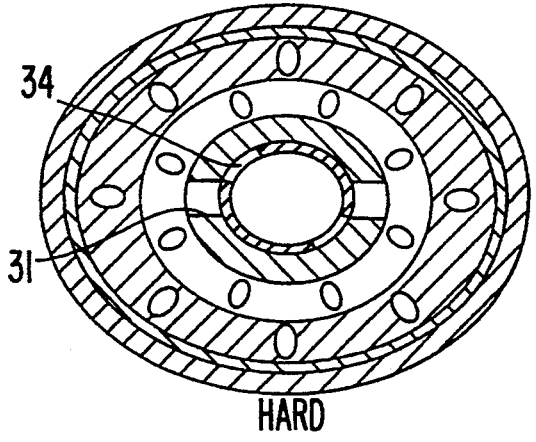

This can further be seen in FIGS. 1E and 1F, wherein the contraction-side inlet opening 33 is shown as fully open with respect to the contraction-side inlet port 32, thus providing soft damping force characteristics during the contraction stroke, and the extension-side inlet opening 34 is fully closed with respect to the extension-side inlet port 31, thus providing hard damping characteristics during the extension stroke.

Thus, it is possible to set different damping force characteristics for the extension and contraction strokes. In addition, the sectional area of the communicating passage formed by the extension-side inlet port 31 and the extension-side inlet opening 34 and the sectional area of the communicating passage formed by the contraction-side inlet port 32 and the contraction-side inlet opening 33 can be continuously changed in accordance with the angle of rotation of the shutter 17. Accordingly, the damping force characteristics can be continuously controlled by varying the passage area of each of the extension- and contraction-side bypass passages. If the shutter 17 is set in a position where both the extension- and contraction-side inlet ports 31 and 32 are closed, both the extension- and contraction-side bypass passages are closed. Therefore, "hard" characteristics are available for both the extension and contraction sides.

In addition, since the inside of the shutter 17 is divided by the partition member 19 into two chambers, that is, the contraction-side chamber 17a and the extension-side chamber 17b, to make the extension- and contraction-side bypass passages independent of each other, the flow of the hydraulic fluid in the bypass passages will not reverse when the direction of stroke of the piston rod 8 changes. Therefore, no turbulent flow will occur, and no noise will be generated.

In addition, the opening of the guide portion 16 of the piston rod 8 is closed with the plug 21, and thus both ends of the guide portion 16, which is fitted with the shutter 17, are closed. Therefore, the pressure of hydraulic fluid in the cylinder 2, which is produced by the extension and contraction of the piston rod 8, will not axially act on the shutter 17. Accordingly, it is possible to rotate the shutter 17 smoothly and hence possible to reduce the force required to actuate the shutter 17. Thus, it is possible to reduce the size of the actuator used to rotate the control rod 18.

Since both the extension-side valve seat member 5 and the contraction-side valve seat member 7 are disposed on the outer periphery of the piston rod 8, it is possible to increase the diameters of the disk valves 29 and 30, which constitute damping force generating mechanisms in the bypass passages. Accordingly, it is possible to set the damping force at a sufficiently low level during the "soft" characteristic mode.

Although in the above-described embodiment the extension-side valve seat member 5 is provided with the check valve 28, the disk valves 29 and the orifices 29a, the check valve 28 may be omitted because the direction of flow of hydraulic fluid in the extension-side bypass passage is regulated to a certain extent by the disk valves 29. Further, the orifices 29a may be omitted. The disk valves 29 may be replaced by a check valve that allows the flow of hydraulic fluid in the same direction as in the case of the disk valves 29. Similarly, the disk valves 30 provided on the contraction-side valve seat member 7 may be replaced by a check valve.

Next, a second embodiment of the present invention will be explained with reference to FIG. 2. The second embodiment differs from the first embodiment in that the piston, the extension-side main valve seat member and the contraction-side main valve seat member are integrated into one unit, and it is also different from the described embodiment in the shutter arrangement. Therefore, portions or members similar to those in the first embodiment are denoted by the same reference numerals, and only the portions in which the second embodiment is different from the first embodiment will be explained below.

Figure 2:
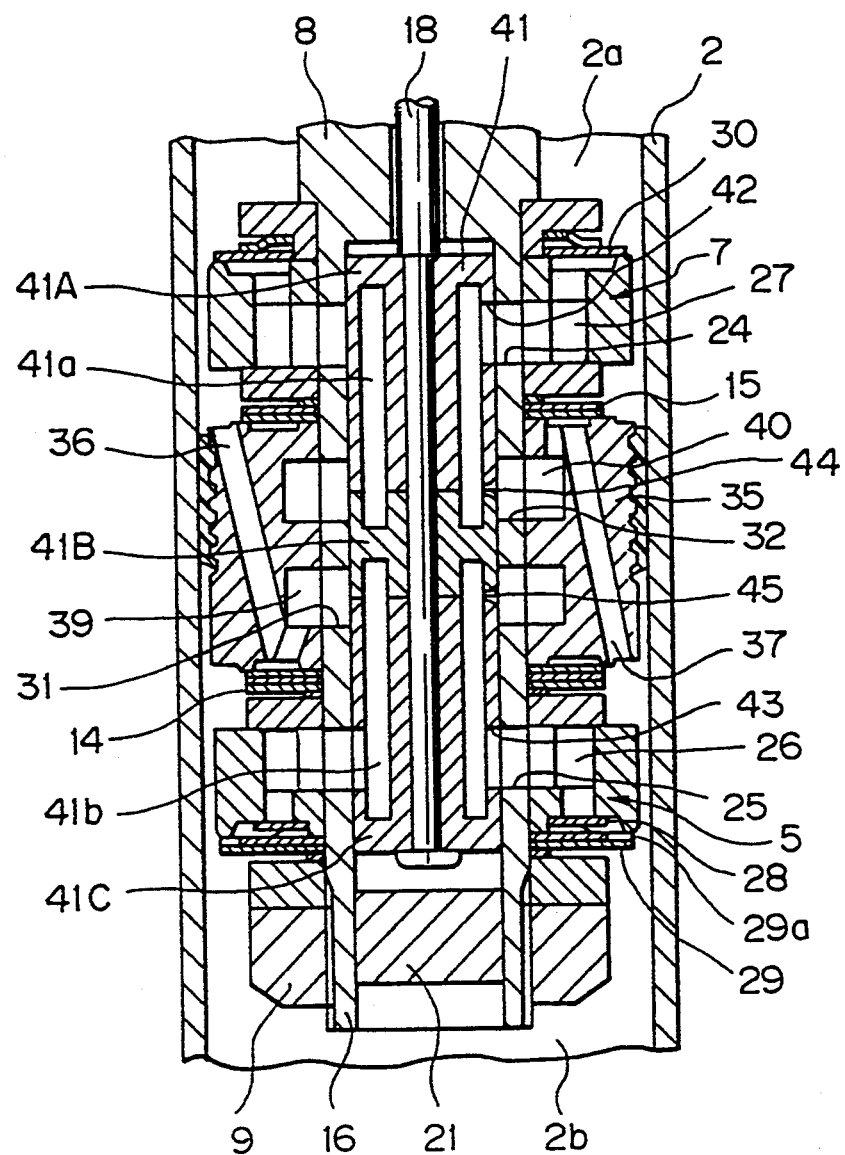
FIG. 2 is a fragmentary longitudinal sectional view showing an essential part of a second embodiment of the damping force control type hydraulic shock absorber according to the present invention.

As shown in FIG. 2, a piston 35 is provided with an extension-side main hydraulic fluid passage 36 and a contraction-side main hydraulic fluid passage 37 for providing communication between the cylinder upper and lower chambers 2a and 2b. The end face of the piston 35 that faces the cylinder lower chamber 2b is provided with disk valves 14 that generate damping force by controlling the flow of hydraulic fluid from the extension-side main hydraulic fluid passage 36 toward the cylinder lower chamber 2b during the extension stroke. The end face of the piston 35 that faces the cylinder upper chamber 2a is provided with disk valves 15 that generate damping force by controlling the flow of hydraulic fluid from the contraction-side main hydraulic fluid passage 37 toward the cylinder upper chamber 2a during the contraction stroke. Further, the extension-side main hydraulic fluid passage 36 is communicated with the extension-side inlet port 31 in the guide portion 16 of the piston rod 8 through a passage 39. The contraction-side main hydraulic fluid passage 37 is communicated with the contraction-side inlet port 32 in the guide portion 16 of the piston rod 8 through a passage 40.

A cylindrical shutter 41 is rotatably fitted in the guide portion 16 of the piston rod 8. The shutter 41 is composed of three members 41A, 41B and 41C, which are joined together by the control rod 18. The shutter 41 has two chambers formed therein, that is, an upper chamber 41a and a lower chamber 41b. The side wall of the shutter 41 is provided with a passage 42 as a contraction-side outlet opening which constantly provides communication between the upper chamber 41a and the passage 24 (contraction-side outlet port) in the guide portion 16, and a passage 43 as an extension-side outlet opening which constantly provides communication between the lower chamber 41b and the passage 25 (extension-side outlet port) in the guide portion 16. The side wall of the shutter 41 is further provided with a contraction-side inlet opening 44 which is communicated with the upper chamber 41a and disposed to face the contraction-side inlet port 32 in the guide portion 16, and an extension-side inlet opening 45 which is communicated with the lower chamber 41b and disposed to face the extension-side inlet port 31 in the guide portion 16. The contraction-side inlet opening 44 and the extension-side inlet opening 45 function in the same way as the contraction-side inlet opening 33 and the extension-side inlet opening 34, which are provided in the shutter 17 of the first embodiment. The extension-side main hydraulic fluid passage 36, the passage 39, the extension-side inlet port 31, the extension-side inlet opening 45, the lower chamber 41b, the passage 43, the passage 25 and the passage 26 form an extension-side bypass passage for providing communication between the cylinder upper and lower chambers 2a and 2b. On the other hand, the contraction-side main hydraulic fluid passage 37, the passage 40, the contraction-side inlet port 32, the contraction-side inlet opening 44, the upper chamber 41a, the passage 42, the passage 24 and the passage 27 form a contraction-side bypass passage for providing communication between the cylinder upper and lower chambers 2a and 2b.

With the above-described arrangement, it is possible to set different damping force characteristics for the extension and contraction sides by controlling the passage areas of the extension- and contraction-side bypass passages with the shutter 41, which is externally rotated. Thus, it is possible to obtain advantageous effects similar to those in the first embodiment.

In the above-described embodiments, damping force in the extension stroke is controlled by the passage area formed by the alignment of the extension-side inlet port 31 and the extension-side inlet opening 34 or 45, and damping force in the contraction stroke is controlled by the passage area formed by the alignment of the contraction-side inlet port 32 and the contraction-side inlet opening 33 or 44. However, the present invention is not necessarily limited to the described arrangement. The arrangement may be such that damping force in the extension stroke is controlled by the passage area formed by the alignment of the passage 25, which serves as an extension-side outlet port, and the passage 23 or 43, which serves as an extension-side outlet opening, and damping force in the contraction stroke is controlled by the passage area formed by the alignment of the passage 24, which serves as a contraction-side outlet port, and the passage 22 or 42, which serves as a contraction-side outlet opening.

Next, a third embodiment of the present invention will be explained with reference to FIG. 4. The damping force control type hydraulic shock absorber 46 in the third embodiment has a structure substantially similar to that in the first embodiment, in which there is additionally provided a pressure-transmitting passage that provides communication between a chamber formed at one end of the shutter in the guide and the cylinder lower chamber and that has a check valve. Therefore, portions or members similar to those in the first embodiment are denoted by the same reference numerals, and only the portions in which the third embodiment is different from the first embodiment will be explained below in detail.

Figure 4:
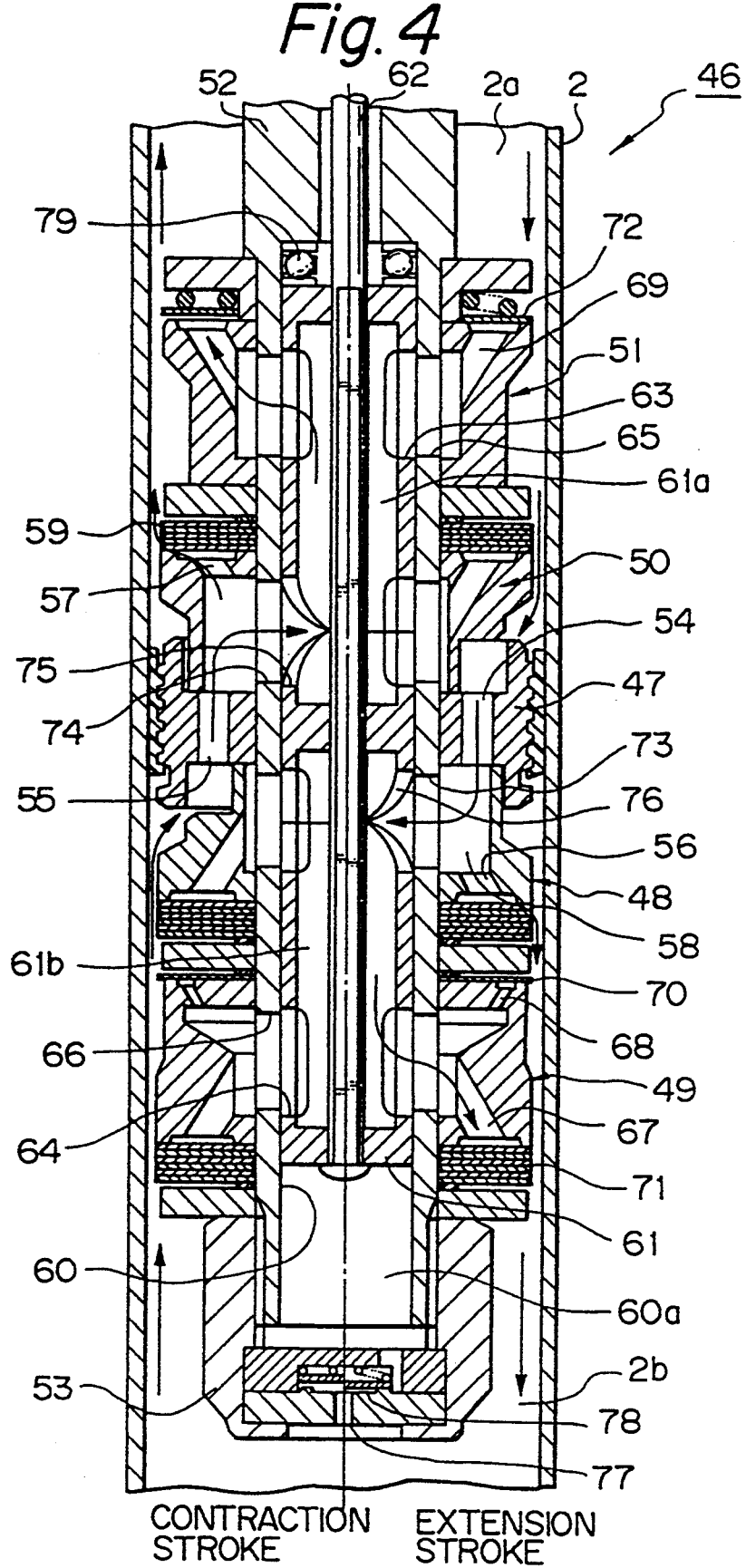
FIG. 4 is a fragmentary longitudinal sectional view showing an essential part of a third embodiment of the damping force control type hydraulic shock absorber according to the present invention.

As shown in FIG. 4, a piston 47 is fitted in the cylinder 2 of a damping force control type hydraulic shock absorber 46. The end face of the piston 47 that faces the cylinder lower chamber 2b is provided with an extension-side main valve seat member 48, and an extension-side valve seat member 49 is provided on the main valve seat member 48. The end face of the piston 47 that faces the cylinder upper chamber 2a is provided with a contraction-side main valve seat member 50, and a contraction-side valve seat member 51 is provided on the main valve seat member 50. These members are pierced by one end portion of a piston rod 52 and secured to the piston rod 52 as one unit by a nut 53. The other end portion of the piston rod 52 extends as far as the outside of the cylinder 2 through a rod guide (not shown) and a seal member (not shown), which are provided in the upper end portion of the cylinder 2.

The piston 47 is provided with an extension-side hydraulic fluid passage 54 and a contraction-side hydraulic fluid passage 55 for providing communication between the cylinder upper and lower chambers 2a and 2b. The extension-side hydraulic fluid passage 54 is communicated with the cylinder lower chamber 2b through a passage 56 in the extension-side main valve seat member 48. The contraction-side hydraulic fluid passage 55 is communicated with the cylinder upper chamber 2a through a passage 57 in the contraction-side main valve seat member 50. The extension-side main valve seat member 48 is provided with a damping force generating mechanism including disk valves 58 that generate damping force by controlling the flow of hydraulic fluid in the passage 56 during the extension stroke. The contraction-side main valve seat member 50 is provided with a damping force generating mechanism including disk valves 59 that generate damping force by controlling the flow of hydraulic fluid in the passage 57 during the contraction stroke. That is, the extension-side hydraulic fluid passage 54, the contraction-side hydraulic fluid passage 55, the passage 56 and the passage 57 constitute main hydraulic fluid passages for providing communication between the cylinder upper and lower chambers 2a and 2b.

The piston rod 52 is formed with a cylindrical guide portion 60, and a cylindrical shutter 61 is rotatably fitted in the guide portion 60. The guide portion 60 and the shutter 61 constitute a damping force control mechanism. A control rod 62 is connected to the shutter 61. The control rod 62 extends through the piston rod 52 as far as the outside of the cylinder 2 so that the shutter 61 can be rotated from the outside of the damping force control type hydraulic shock absorber 46. The shutter 61 is formed with two chambers therein, that is, a contraction-side chamber 61a and an extension-side chamber 61b.

The side wall of the shutter 61 is provided with a passage 63 as a contraction-side outlet opening that is communicated with the contraction-side chamber 61a, and a passage 64 as an extension-side outlet opening that is communicated with the extension-side chamber 61b. The guide portion 60 of the piston rod 52 is provided with a passage 65 as a contraction-side outlet port that is constantly communicated with the passage 63, and a passage 66 as an extension-side outlet port that is constantly communicated with the passage 64. The passage 66 in the guide portion 60 is communicated with the cylinder lower chamber 2b through a passage 67 and an orifice passage 68, which are provided in the extension-side valve seat member 49. The passage 65 in the guide portion 60 is communicated with the cylinder upper chamber 2a through a passage 69 in the contraction-side valve seat member 51.

The extension-side valve seat member 49 is provided with a check valve 70 that allows the flow of hydraulic fluid through the orifice passage 68 during the extension stroke, and a damping force generating mechanism including disk valves 71 that generate damping force by controlling the flow of hydraulic fluid in the passage 67 during the extension stroke. The pressure at which the check valve 70 opens is smaller than that at which the disk valves 71 open. The contraction-side valve seat member 51 is provided with a check valve 72 that allows the flow of hydraulic fluid through the passage 69 only during the contraction stroke. The orifice passage 68 and the disk valves 71, which are provided on the extension-side valve seat member 49, are set so as to generate a damping force smaller than that generated by the disk valves 58 on the extension-side main valve seat member 48.

The guide portion 60 of the piston rod 52 is provided with an extension-side inlet port 73 that is communicated with the extension-side hydraulic fluid passage 54 in the piston 47, and a contraction-side inlet port 74 that is communicated with the contraction-side hydraulic fluid passage 55. The shutter 61 is provided with a contraction-side inlet opening 75 that is communicated with the contraction-side chamber 61a. The contraction-side inlet opening 75 is disposed at a position which faces the contraction-side inlet port 74. The shutter 61 is further provided with an extension-side inlet opening 76 that is communicated with the extension-side chamber 61b. The extension-side inlet opening 76 is disposed at a position which faces the extension-side inlet port 73. The extension-side hydraulic fluid passage 54, the extension-side inlet port 73, the extension-side inlet opening 76, the extension-side chamber 61b, the passage 64, the passage 66, the passage 67 and the orifice passage 68 form an extension-side bypass passage for providing communication between the cylinder upper and lower chambers 2a and 2b. On the other hand, the contraction-side hydraulic fluid passage 55, the contraction-side inlet port 74, the contraction-side inlet opening 75, the contraction-side chamber 61a, the passage 63, the passage 65 and the passage 69 form a contraction-side bypass passage for providing communication between the cylinder upper and lower chambers 2a and 2b.

The contraction-side inlet opening 75 and the extension-side inlet opening 76 are each formed in a generally wedge-shaped configuration in the same way as in the first embodiment. The arrangement is such that when the communicating passage that is formed by the alignment of the extension-side inlet port 73 and the extension-side inlet opening 76 is fully open, the communicating passage formed by the alignment of the contraction-side inlet port 74 and the contraction-side inlet opening 75 is fully closed. As the shutter 61 is rotated in one direction in this state, the sectional area of the communicating passage formed by the extension-side inlet port 73 and the extension-side inlet opening 76 decreases, while the sectional area of the communicating passage formed by the contraction-side inlet port 74 and the contraction-side inlet opening 75 increases. When the communicating passage that is formed by the alignment of the extension-side inlet port 73 and the extension-side inlet opening 76 is fully closed, the communicating passage formed by the alignment of the contraction-side inlet port 74 and the contraction-side inlet opening 75 is fully open.

The open end of the guide portion 60 formed in the piston rod 52 is provided with an orifice passage 77 as a pressure-transmitting passage that provides communication between a chamber 60a formed at one end of the shutter 61 in the guide portion 60 and the cylinder lower chamber 2b, and a check valve 78 that allows the hydraulic fluid to flow only from the cylinder lower chamber 2b into the guide portion 60 through the orifice passage 77. In addition, a thrust bearing 79 is interposed in the area between the bottom of the guide portion 60 and the upper end of the shutter 61.

The operation of the third embodiment, arranged as described above, will be explained below. It should be noted that the arrows on the right-hand side as viewed in FIG. 4 show the flow of hydraulic fluid during the extension stroke of the piston rod 52, while the arrows on the left-hand side show the flow of hydraulic fluid during the contraction-stroke.

Damping force characteristics can be changed by rotating the shutter 61 with the control rod 62, which is externally operated, in the same way as in the first embodiment.

When the shutter 61 is rotated so that the communicating passage formed by the extension-side inlet port 73 and the extension-side inlet opening 76 is fully opened, while the communicating passage formed by the contraction-side inlet port 74 and the contraction-side inlet opening 75 is fully closed, the extension-side bypass passage is fully open, while the contraction-side bypass passage is fully closed. Accordingly, during the extension stroke of the piston rod 8, the check valve 70 and the disk valves 71, which are provided on the extension-side valve seat member 49, open, and the hydraulic fluid in the cylinder upper chamber 2a can flow toward the cylinder lower chamber 2b through the extension-side bypass passage. Thus, a relatively small damping force is generated because of the passage area formed by the extension-side inlet port 73 and the extension-side inlet opening 76 and by the action of the orifice passage 68 and the disk valves 71 on the extension-side valve seat member 49. On the other hand, during the contraction stroke, the check valve 70 and the disk valves 71, which are provided on the extension-side valve seat member 49, are closed, and hence the extension-side bypass passage is closed. Therefore, the hydraulic fluid in the cylinder lower chamber 2b flows toward the cylinder upper chamber 2a through the contraction-side passage 55 in the piston 47 and the passage 57 in the contraction-side main valve seat member 50. Accordingly, a relatively large damping force is generated by the action of the disk valves 59 on the contraction-side main valve seat member 50. Thus, the damping force characteristics are "soft" during the extension stroke and "hard" during the contraction stroke.

When the shutter 61 is rotated in one direction from the above-described position so that the area of the communicating passage formed by the extension-side inlet port 73 and the extension-side inlet opening 76 is reduced, while the communicating passage formed by the contraction-side inlet port 74 and the contraction-side inlet opening 75 is opened, the passage area of the extension-side bypass passage decreases, while the contraction-side bypass passage opens. Accordingly, during the extension stroke of the piston rod 52, the hydraulic fluid in the cylinder upper chamber 2a can flow toward the cylinder lower chamber 2b through the extension-side bypass passage in the same way as above. Therefore, the damping force increases by an amount corresponding to the reduction in the passage area. At this time, the contraction-side bypass passage is closed by the check valve 72 provided on the contraction-side valve seat member 51. On the other hand, during the contraction stroke, the check valve 72 on the contraction-side valve seat member 51 opens, so that the hydraulic fluid in the cylinder lower chamber 2b can flow toward the cylinder upper chamber 2a through the contraction-side bypass passage. Accordingly, a damping force smaller than that of the "hard" characteristics is generated in accordance with the area of the communicating passage formed by the contraction-side inlet port 74 and the contraction-side inlet opening 75. Thus, the damping force characteristics are "medium" during both the extension and contraction strokes, and a damping force smaller than that of the "hard" characteristics is generated.

When the shutter 61 is further rotated in the same direction from the above-described position so that the communicating passage formed by the extension-side inlet port 73 and the extension-side inlet opening 76 is fully closed, while the communicating passage formed by the contraction-side inlet port 74 and the contraction-side inlet opening 75 is fully opened, the extension-side bypass passage is fully closed, while the contraction-side bypass passage is fully open. Accordingly, during the extension stroke of the piston rod 52, the check valve 72 on the contraction-side valve seat member 51 is closed, and hence the contraction-side bypass passage is closed. Therefore, the hydraulic fluid in the cylinder upper chamber 2a flows toward the cylinder lower chamber 2b through the extension-side passage 54 in the piston 47 and the passage 56 in the extension-side main valve seat member 48. Accordingly, a relatively large damping force is generated by the action of the disk valves 58 on the extension-side main valve seat member 48. On the other hand, during the contraction stroke, the check valve 72 on the contraction-side valve seat member 51 opens, so that the hydraulic fluid in the cylinder lower chamber 2b can flow toward the cylinder upper chamber 2a through the contraction-side bypass passage. Therefore, a relatively small damping force is generated because of the passage area formed by the contraction-side inlet port 74 and the contraction-side inlet opening 75. Accordingly, the damping force characteristics are "hard" during the extension stroke and "soft" during the contraction stroke.

Thus, it is possible to set different damping force characteristics for the extension and contraction strokes and continuously control the damping force characteristics by varying the passage areas of the extension- and contraction-side bypass passages in the same way as in the first embodiment. It is also possible to obtain "hard" characteristics for both the extension and contraction sides by setting the shutter 61 in a position where both the extension- and contraction-side bypass passages are closed. In addition, since the inside of the shutter 61 is divided into two chambers, that is, the contraction-side chamber 61a and the extension-side chamber 61b, to make the extension- and contraction-side bypass passages independent of each other, the flow of the hydraulic fluid in the bypass passages will not reverse when the direction of stroke of the piston rod 52 changes. Therefore, no turbulent flow will occur, and no noise will be generated.

Further, in the damping force control type hydraulic shock absorber 46 according to the third embodiment, during the extension stroke of the piston rod 52, the pressure in the cylinder upper chamber 2a acts on the lower part of the shutter 61 through the extension-side inlet port 73, causing the chamber 60a outside the lower end of the shutter 61 to be pressurized by the pressure of hydraulic fluid leaking through the gap between the guide portion 60 and the shutter 61. Since the check valve 78 for the orifice passage 77 is closed at this time, the shutter 61 is pushed up and pressed against the thrust bearing 79 by the applied pressure. On the other hand, during the contraction stroke of the piston rod 52, the pressure of hydraulic fluid in the cylinder lower chamber 2b acts on the upper part of the shutter 61 through the contraction-side inlet port 74, causing the upper end portion of the shutter 61 to be pressurized by the pressure of hydraulic fluid leaking through the gap between the guide portion 60 and the shutter 61. At this time, the check valve 78 for the orifice passage 77 opens, so that the chamber 60a outside the lower end of the shutter 61 is directly pressurized by the high pressure in the cylinder lower chamber 2b. Therefore, the shutter 61 is pushed up and pressed against the thrust bearing 79. Thus, the shutter 61 is pressed against the thrust bearing 69 at all times regardless of whether the piston rod 52 extends or contracts, and it is therefore possible to prevent the generation of noise due to vertical movement of the shutter 61. It should be noted that the shutter 61 can rotate smoothly, because it is pressed against the thrust bearing 79 and is effectively supported by it.

Next, a fourth embodiment of the present invention will be explained with reference to FIGS. 5 and 6. Since the damping force control type hydraulic shock absorber 80 of the fourth embodiment differs from the third embodiment only in the arrangement of the extension- and contraction-side valve seat members, portions or members similar to those in the third embodiment are denoted by the same reference numerals, and only the portions in which the fourth embodiment is different from the third embodiment will be explained below in detail.

Figure 5:
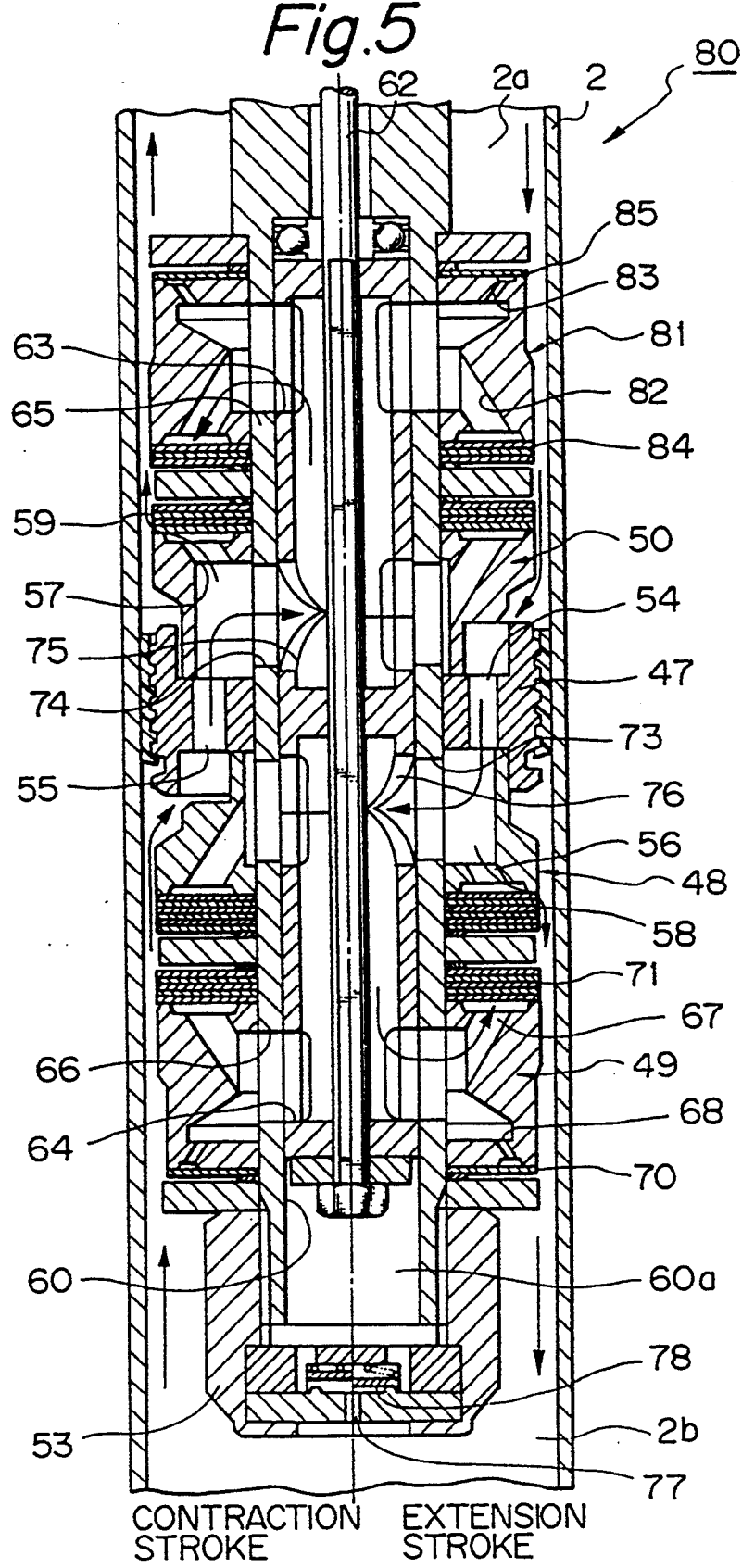
FIG. 5 is a fragmentary longitudinal sectional view showing an essential part of a fourth embodiment of the damping force control type hydraulic shock absorber according to the present invention.
Figure 6:
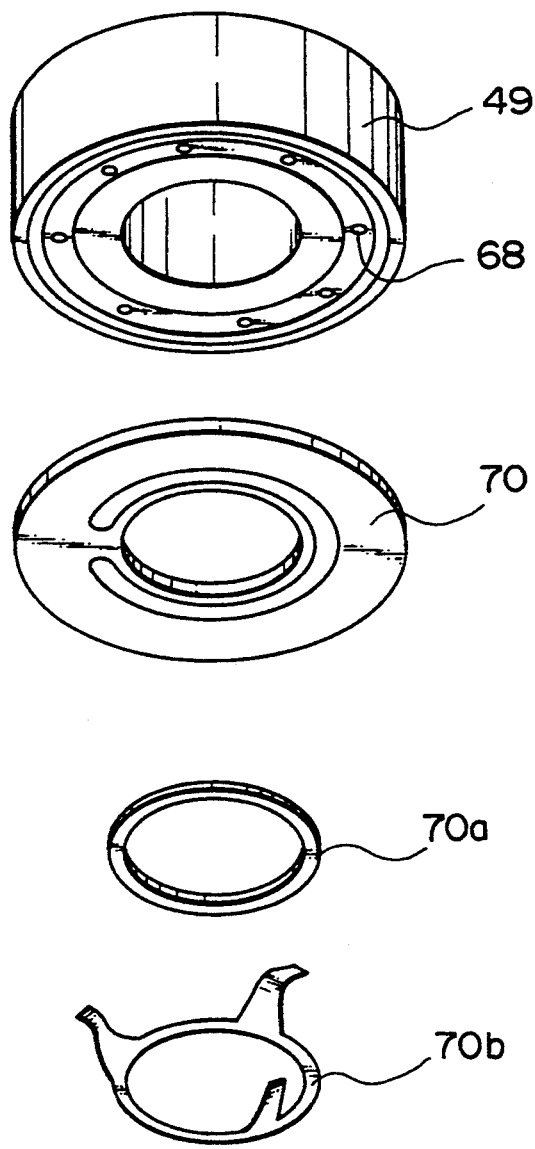
FIG. 6 is an exploded perspective view of an extension-side valve seat member and a check valve which are used in the damping force control type hydraulic shock absorbers shown in FIGS. 4 and 5.
Figure 1A:
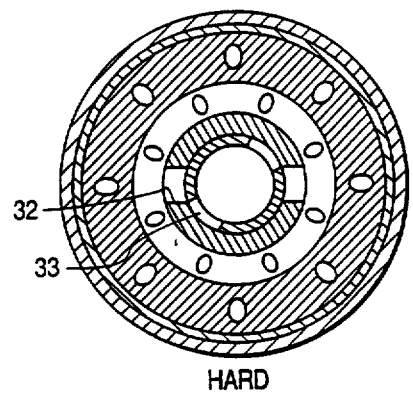
Figure 1B:
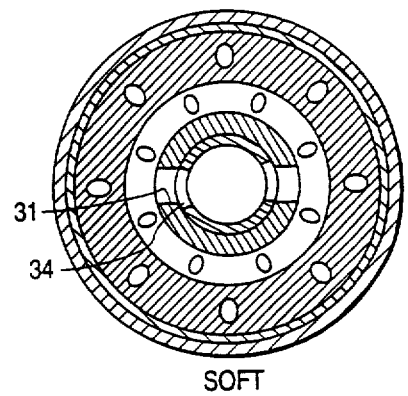
Figure 1C:
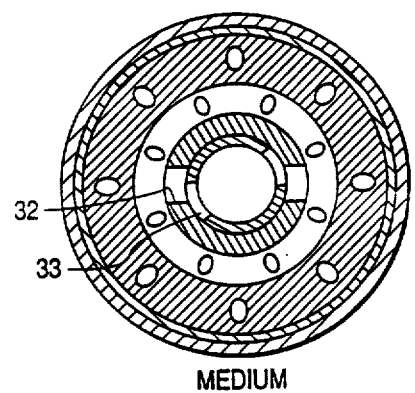
Figure 1D:
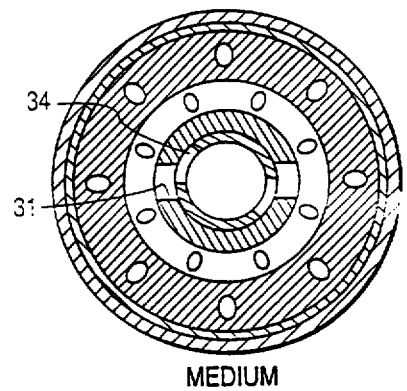
Figure 1E:
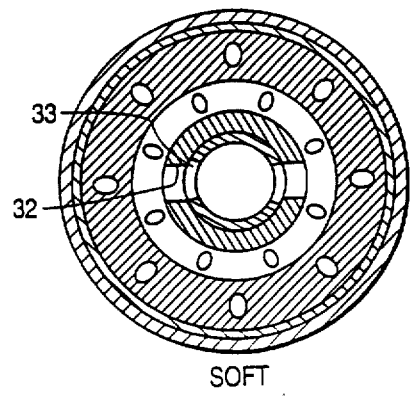
Figure 1F:
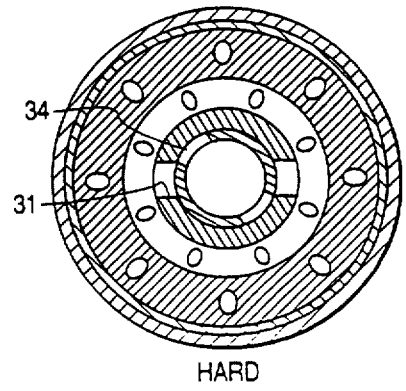

As shown in FIG. 5, in the damping force control type hydraulic shock absorber 80, the extension-side valve seat member 49 is attached to the piston rod 52 in inverted relation to that in the third embodiment. More specifically, the disk valves 71 are disposed to face upward, while the check valve 70 is disposed to face downward, as shown in FIG. 6. In the figure, reference numeral 70a denotes a retainer, and 70b a spring. In addition, a contraction-side valve seat member 81 is provided with a passage 82 and an orifice passage 83 for providing communication between the passage 63 in the piston rod 52 and the cylinder upper chamber 2a. The contraction-side valve seat member 81 is also provided with a damping force generating mechanism including disk valves 84 that generate damping force by controlling the flow of hydraulic fluid through the passage 82 during the contraction stroke, and a check valve 85 that allows the flow of hydraulic fluid through the orifice passage 83 only during the contraction stroke. The pressure at which the check valve 85 opens is smaller than that at which the disk valves 84 open. It should be noted that the disk valves 84 are disposed to face downward, while the check valve 85 is disposed to face upward.

With the above-described arrangement, different damping force characteristics can be set for the extension and contraction sides by rotating the shutter 61, and the damping force characteristics can be continuously controlled in the same way as in the third embodiment. If the system is set so that "soft" characteristics are available during the contraction stroke, damping force is generated by the action of the orifice passages 83 and the disk valves 84. Therefore, orifice and valve characteristics are obtained. In addition, no turbulent flow will occur when the direction of stroke of the piston rod 52 changes, and hence no noise will be generated. Further, since the shutter 61 is pressed against the thrust bearing 69 at all times irrespective of the direction of extension and contraction of the piston rod 52, it is possible to prevent the generation of noise due to vertical movement of the shutter 61, and the shutter 61 can be smoothly rotated.

In addition, the damping force control type hydraulic shock absorber 80 of the fourth embodiment provides the following advantages. The check valve 70 is disposed on the extension-side valve seat member 49 to face downward, while the check valve 85 is disposed on the contraction-side valve seat member 81 to face upward, in inverted relation to those in the third embodiment. Therefore, the hydraulic fluid applies pressure, without substantially changing the direction of flow, to the check valve 70, which opens at extremely low piston speed during the extension stroke where the piston 47 moves upwardly. Therefore, it is easy for the check valve 70 to open. On the other hand, the hydraulic fluid applies pressure to the disk valves 71 with the direction of flow changed through approximately 180°. Therefore, it is difficult for the disk valves 71 to open. At extremely low piston speed during the contraction stroke where the piston 47 moves downwardly, the check valve 85 on the contraction-side valve seat member 81 is allowed to open easily, so that it is possible to smoothly set up a damping force of "soft" orifice characteristics. Thus, in the fourth embodiment, even more stable low damping force characteristics can be obtained by disposing the valve (check valve) that opens at extremely low piston speed and the valve that opens thereafter in inverted relation to those in the third embodiment.

As has been detailed above, according to the damping force control type hydraulic shock absorber of the present invention, the extension-side bypass passage and the contraction-side bypass passage allow the flow of hydraulic fluid only during respective piston rod strokes which are different from each other. Therefore, it is possible to select a combination of different damping force characteristics for the extension and contraction sides by controlling the passage area of each of the extension- and contraction-side bypass passages by rotating the shutter. As a result, it becomes possible to obtain a combination of damping force characteristics, such as "soft" characteristics for the extension side and "hard" characteristics for the contraction side, and vice versa. Thus, the selective range for damping force characteristics can be enlarged. In addition, since the shutter of the damping force control mechanism has two chambers, that is, an extension-side chamber and a contraction-side chamber, and the extension-side bypass passage and the contraction-side bypass passage are communicated through the respective chambers, there is no occurrence of a turbulent flow which would otherwise be induced by a change in the direction of flow of hydraulic fluid inside the shutter when the piston rod stroke changes. Thus, it is possible to prevent generation of noise.

According to the damping force control type hydraulic shock absorbers of the third and fourth embodiments, when the piston moves toward one side, the chamber outside one end of the shutter is pressurized and the associated check valve is closed by the pressure of hydraulic fluid leaking through the gap between the guide and the shutter, causing the shutter to be pressed against one end of the guide. When the piston moves toward the other side, the chamber outside the other end of the shutter is pressurized by the pressure of hydraulic fluid leaking through the gap between the guide and the shutter. At this time, the check valve opens to introduce the pressure in one cylinder chamber, which is pressurized during this stroke, into the chamber outside the first-mentioned end of the shutter, causing the shutter to be pressed against the above end of the guide. Accordingly, the shutter is pressed against one end of the guide at all times irrespective of the direction of movement of the piston. Therefore, there is no possibility of the shutter moving in response to the extension and contraction of the piston rod, and it is possible to prevent generation of noise due to movement of the shutter.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A damping force control hydraulic shock absorber comprising:

a cylinder having a hydraulic fluid sealed therein;

a piston slidably fitted in said cylinder to define therein two cylinder chambers;

a piston rod connected at one end thereof to said piston, the other end of said piston rod extending outside of said cylinder;

a main hydraulic fluid passage providing communication between said two cylinder chambers and having a damping force generating mechanism;

an extension-side bypass passage providing communication between said two cylinder chambers and having a check valve that allows flow of hydraulic fluid during an extension stroke;

a contraction-side bypass passage providing communication between said two cylinder chambers and having a check valve that allows flow of hydraulic fluid during a contraction stroke; and a damping force control mechanism including a cylindrical guide having a pair of extension-side inlet and outlet ports formed in a side wall thereof to provide communication for said extension-side bypass passage and further having a pair of contraction-side inlet and outlet ports formed in the side wall to provide communication for said contraction-side bypass passage, and a cylindrical shutter rotatably fitted in said guide and having an extension-side chamber and a contraction-side chamber isolated from the extension-side chamber, said shutter having a side wall provided with a pair of extension-side inlet and outlet openings communicated with said extension-side chamber and a pair of contraction-side inlet and outlet openings communicated with said contraction-side chamber, wherein said shutter is adjustable so that said extension-side inlet and outlet ports and said extension-side inlet and outlet openings are respectively aligned with each other and said contraction-side inlet and outlet ports and said contraction-side inlet and outlet openings are respectively aligned with each other by rotating said shutter, thereby selectively allowing said extension-side bypass passage to communicate through said extension-side chamber and also selectively allowing said contraction-side bypass passage to communicate through said contraction-side chamber, and thus controlling a passage area of each of said extension- and contraction-side bypass passages.

2. A damping force control hydraulic shock absorber according to claim 1, wherein at least one of said check valves is a disk valve for generating damping force.

3. A damping force control hydraulic shock absorber according to claim 2, wherein one of said bypass passages, having said disk valve for generating damping force as said check valve thereof, has a second check valve in parallel with said disk valve, the pressure at which said second check valve is opened being smaller than that at which said disk valve opens.

4. A damping force control hydraulic shock absorber according to claim 3, wherein said second check valve comprises a disk valve which opens, when the piston moves in the direction which allows the second check valve to open, by deflecting in the direction opposite to this direction of the piston movement.

5. A damping force control type hydraulic shock absorber according to claim 2, further comprising:

a pair of chambers formed outside opposite ends, respectively, of said shutter by closing opposite ends of said cylindrical guide;

a pressure-transmitting passage for providing communication between one of said pair of chambers outside one of said opposite ends of said shutter, which is pressurized by hydraulic fluid leaking through a gap between said guide and said shutter in response to movement of said piston in one direction, and one of said cylinder chambers, which is pressurized by the movement of said piston in the other direction; and a check valve provided in said pressure-transmitting passage to allow flow of hydraulic fluid only from the one of said cylinder chambers toward the one of said paid of chambers outside said one of said opposite ends of said shutter.

6. A damping force control hydraulic shock absorber according to claim 5, wherein a thrust bearing is provided in the other of said pair of chambers outside the other of said opposite ends of said shutter in order to facilitate rotation of said shutter.

7. A damping force control hydraulic shock absorber according to claim 1, further comprising:

a pair of chambers formed outside opposite ends, respectively, of said shutter by closing opposite ends of said cylindrical guide;

a pressure-transmitting passage for providing communication between one of said pair of chambers outside one of said opposite ends of said shutter, which is pressurized by hydraulic fluid leaking through a gap between said guide and said shutter in response to movement of said piston in one direction, and one of said cylinder chambers, which is pressurized by the movement of said piston in the other direction; and a check valve provided in said pressure-transmitting passage to allow flow of hydraulic fluid only from the one of said cylinder chambers toward the one of said paid of chambers outside said one of said opposite ends of said shutter.

8. A damping force control hydraulic shock absorber according to claim 7, wherein a thrust bearing is provided in the other of said pair of chambers outside the other of said opposite ends of said shutter in order to facilitate rotation of said shutter.

* * * * *

UNITED STATES PATENT AND TRADEMARK OFFICE
CERTIFICATE OF CORRECTION

PATENT NO. : 5,404,973
DATED : April 11, 1995
INVENTOR(S) : Tetsuo KATOH et al.

It is certified that error appears in the above-identified patent and that said Letters Patent is hereby corrected as shown below:

In the Drawings:
Replace drawing Figs. 1A-1F with the attached drawing Figs. 1A-1F.

Signed and Sealed this

Seventh Day of November, 1995

Attest:

BRUCE LEHMAN

*Attesting Officer*    *Commissioner of Patents and Trademarks*

HARD

SOFT

MEDIUM

MEDIUM

SOFT

HARD